United States Patent [19]
Lindholm

[11] 4,200,334
[45] Apr. 29, 1980

[54] TRANSPORT CONTAINER WITH A DEVICE FOR SIDE TIPPING

[76] Inventor: Jan E. Lindholm, Folkets Husgatan 13, S-810 70 Älvkarleby, Sweden

[21] Appl. No.: 886,686

[22] Filed: Mar. 15, 1978

[30] Foreign Application Priority Data

Mar. 17, 1977 [SE] Sweden .............................. 7703033

[51] Int. Cl.² ............................................ B60D 1/16
[52] U.S. Cl. ....................................... 298/7; 105/271; 298/11; 298/18; 298/19 V; 298/22 F; 298/22 P; 414/421; 414/470
[58] Field of Search ............... 298/7, 10, 11, 13, 17 R, 298/17 B, 17.5, 17.6, 7.7, 17.8, 18, 19 R, 19 B, 19 V, 22 R, 22 F, 22 P, 21 V; 214/312, 313, 314, 315, 501, 502, 507, 512; 105/242, 261 R, 265, 270, 271, 272–275; 414/419–422, 468, 469, 659, 470

[56] References Cited

U.S. PATENT DOCUMENTS

| 1,031,875 | 7/1912 | Shaefers | 105/271 |
| 3,633,971 | 1/1972 | Berky et al. | 298/10 |
| 3,944,284 | 3/1976 | Kent | 214/313 X |

FOREIGN PATENT DOCUMENTS

| 550911 | 9/1956 | Belgium | 298/7 |
| 863954 | 12/1952 | Fed. Rep. of Germany | 298/17.8 |
| 1220193 | 6/1966 | Fed. Rep. of Germany | 298/13 |
| 1325088 | 3/1963 | France | 214/315 |

*Primary Examiner*—Frank E. Werner
*Attorney, Agent, or Firm*—Young & Thompson

[57] ABSTRACT

A transport container on a truck or a trailer may be lifted by means of two pivot arms operated by hydraulic jacks. The container is rotated in response to the lifting movement and in the final emptying position, the center of gravity of the container is still vertically inside the track of the wheels of the truck or trailer.

6 Claims, 8 Drawing Figures

U.S. Patent  Apr. 29, 1980  Sheet 1 of 5  4,200,334

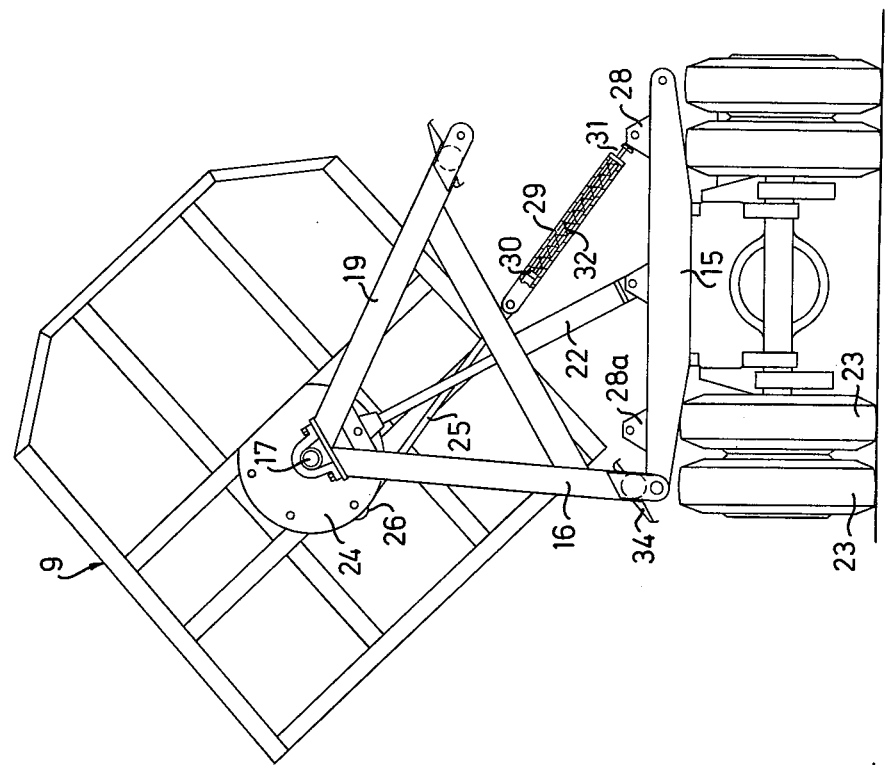
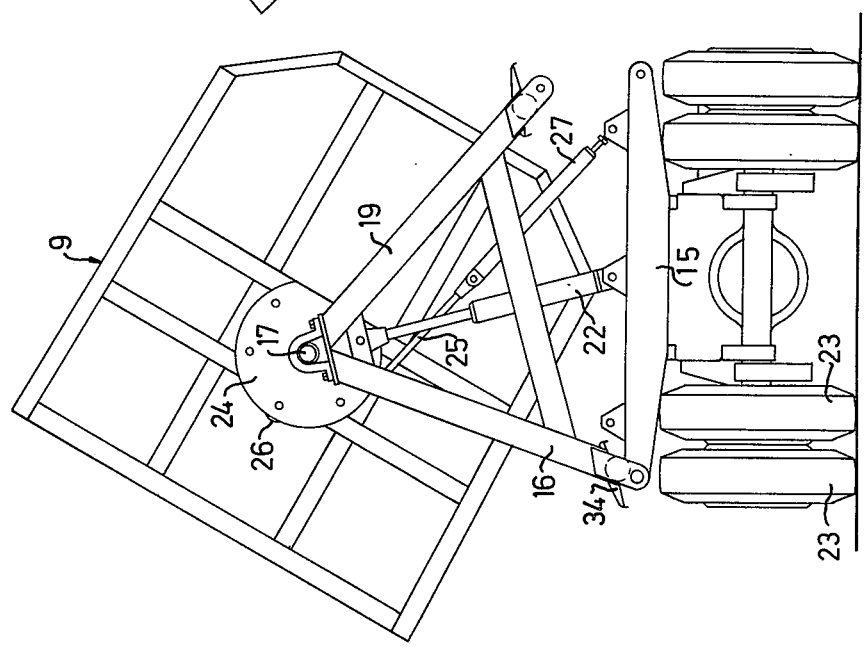

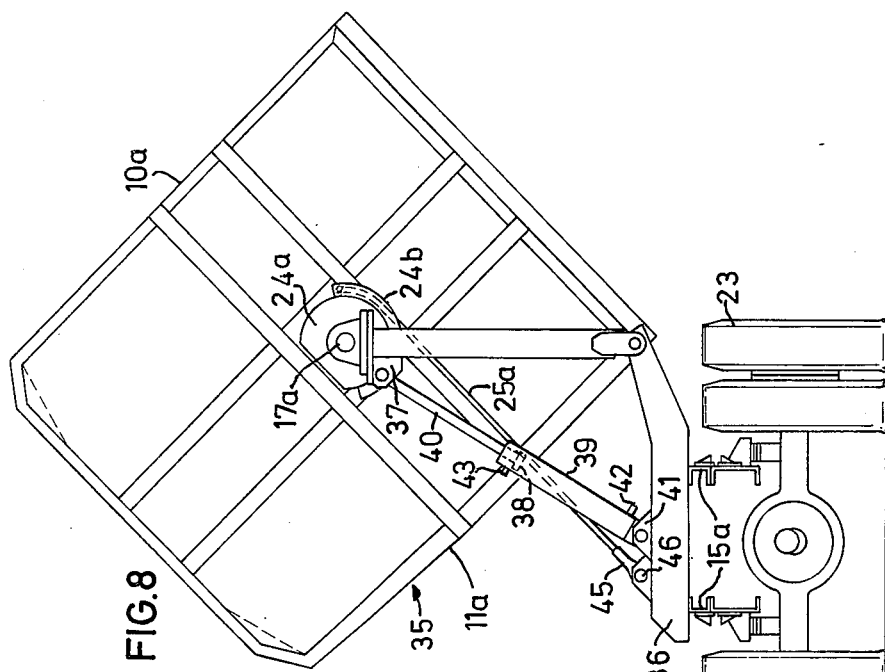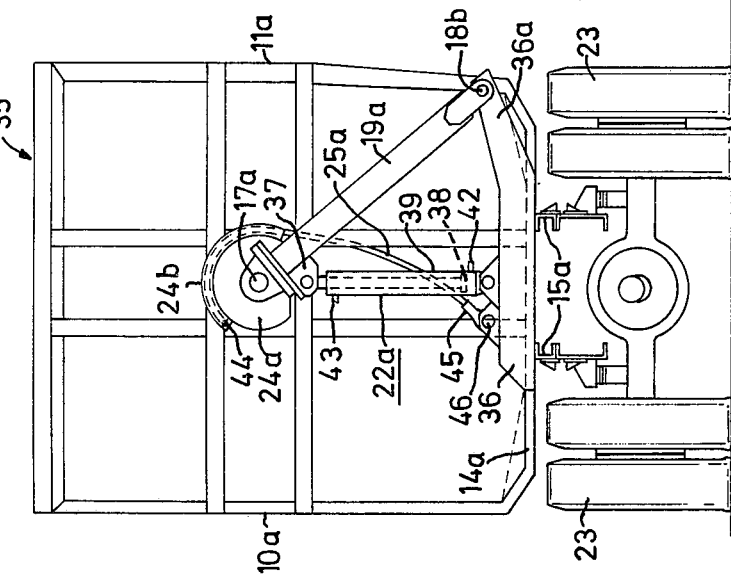

TRANSPORT CONTAINER WITH A DEVICE FOR SIDE TIPPING

The present invention relates to a transversely tippable transport container for being transported primarily by trucks and trailers, for example on forest roads for forest products such as tree stumps and similar loads.

The object of the invention is to provide a transport container having rigidly connected side walls and end walls and which is equipped with a rapid, effective, robust and functionally reliable device for lifting the container to a minimum height and side tipping the container in such a manner that the centre of gravity of the container during tipping movement is vertical within the track formed by the carrying wheels of the vehicle.

This object has been achieved by a transport container according to the invention being given the distinguishing features as defined in claim 1.

The invention will now be described while referring to the appended drawings, whereon is shown, by way of example, two embodiments of the transport container according to the invention.

Figure 1:
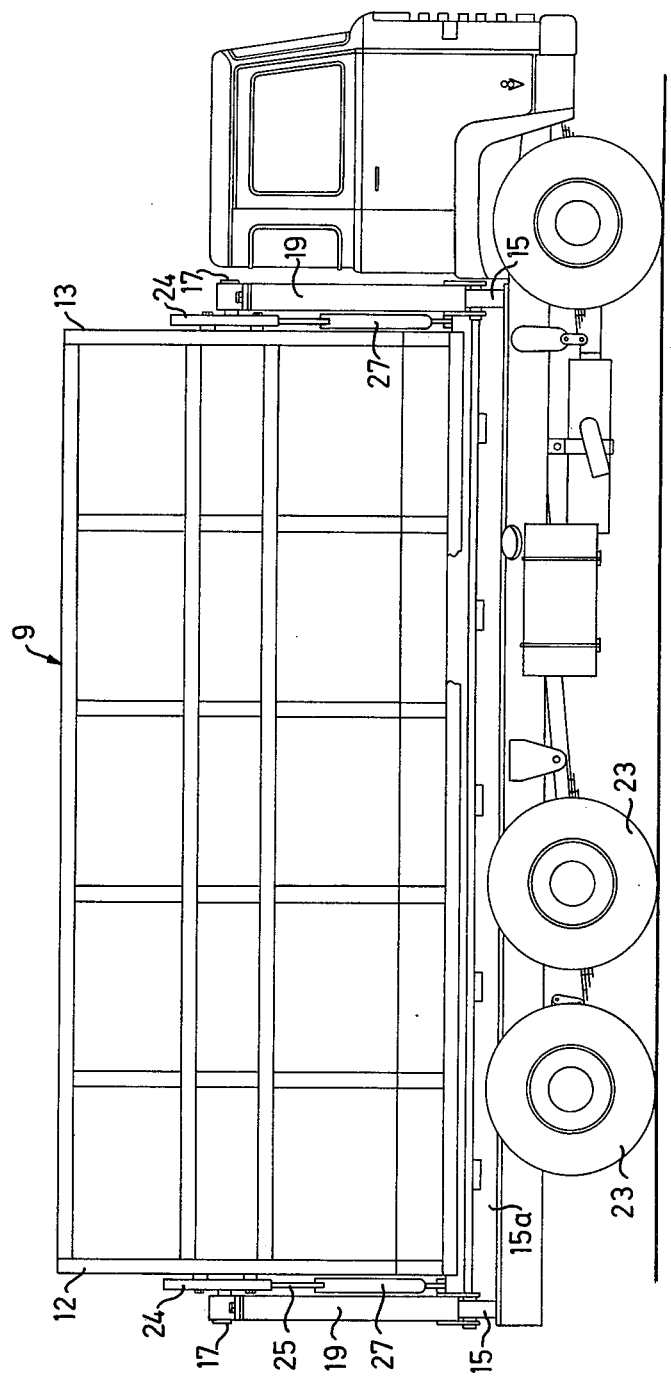
Figure 2:
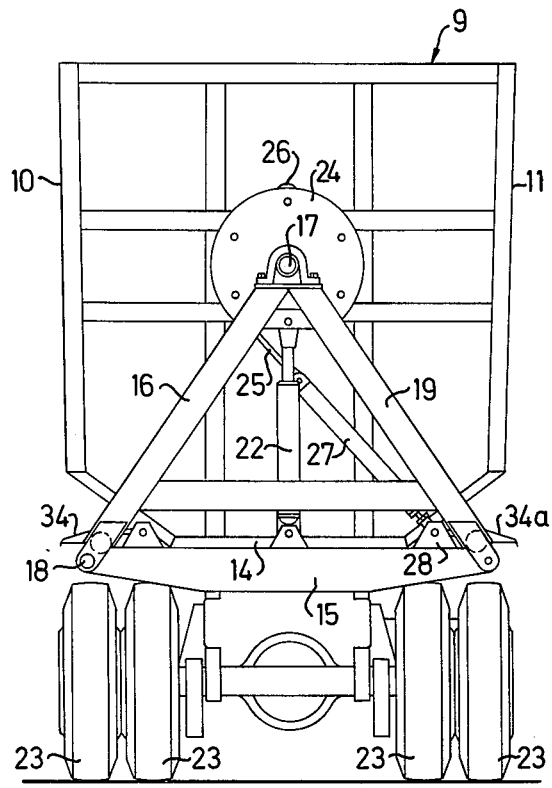
Figure 6:
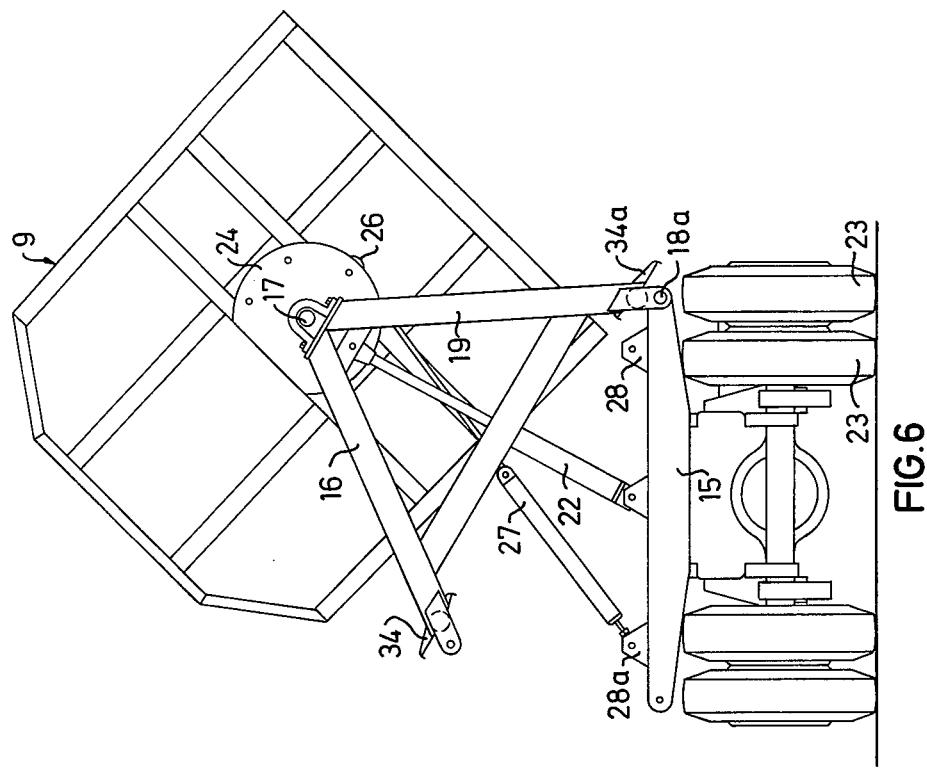
Figure 5:
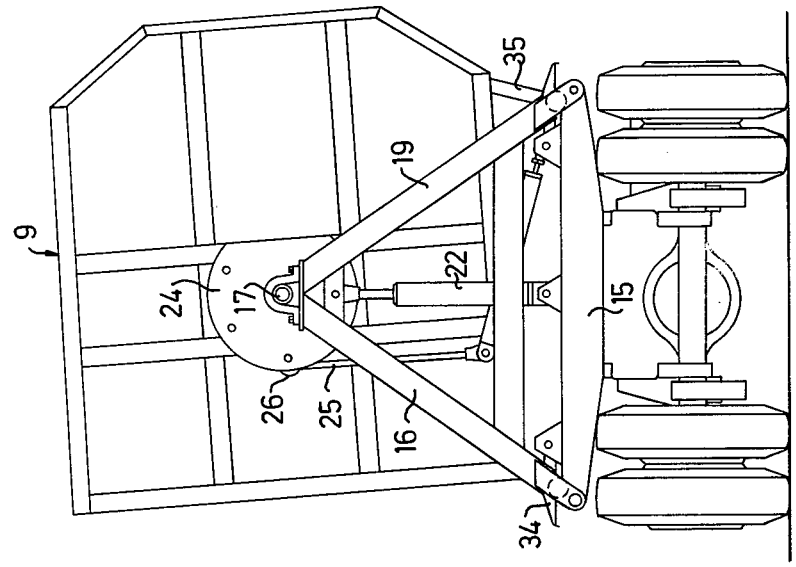

FIG. 1 is a side view of a truck with a container arranged according to the invention, FIG. 2 is an end view of the truck with the container in the transporting position, FIG. 3 shows the container in an intermediate position where it is raised and tipped towards one side of the vehicle, FIG. 4 shows the container in a final position for emptying, FIG. 5 shows the container in an inactive position of rest, FIG. 6 shows the container in the same emptying position as in FIG. 4 but tipped in the opposite direction, and FIGS. 7 and 8 show an end view of a simplified embodiment in two positions.

In the example shown, the container 9 has side walls 10,11 and end walls 12,13 rigidly connected together and to the bottom 14 of the container. In FIGS. 1 and 2 the container is placed with its flat bottom 14 on longitudinal carrying beams 15a attached to the frame beams or chassis of the vehicle. As is apparent from FIGS. 1-3, the container is connected to transverse carrying beams 15 by means of two pivoting arms 16,16 (only one is visible) which are pivotably mounted on a journalling means such as a trunnion 17 on either end wall 12,13 and extend at an angle down towards one side of the chassis where they are each pivotably connected to a mounting means on the carrying beams 15 by means of a pin 18, inserted in a hole in the outer end of the adjacent beam 15.

In the example shown, two further pivoting arms 19,19 extend from the trunnions 17 down to the other side of the chassis and are there pivotably connectable to the carrying beams 15 in the same way as the pivoting arms 16,16 on the opposite side of the chassis, i.e. by means of the pins 18a (FIG. 6). The pairs of pivoting arms 16,19 and 16,19, respectively, are rigidly connected to form a supporting trestle at either end wall 12 and 13, respectively.

The trunnions 17 are situated on the vertical centre lines of the end walls in FIG. 2, and in the example shown they are at rather more than approximately half the height of the container.

At either end wall, the container can be lifted and the pivoting arm swung by means of a lifting unit in the shape of a hydraulic jack 22 pivotably attached between a point at the middle of the respective carrying beam 15 and at the upper end of the pivoting arm 16 and 20, respectively.

When the jacks 22 at the ends of the container are actuated for swinging the arms 16,16 upwardly from the position in FIG. 2, the container will be lifted away from the carrying beams and simultaneously moved transversely in the direction of that side of the vehicle where the pivoting arms 16 are journalled. The arms 16,16 are not swung further than to a position where the container with its contents retains its centre of gravity vertically inside the track of the carrying wheels 23 of the vehicle, which prevents the possibility of tipping the vehicle.

Simultaneously with lifting the container 9 it is to be tipped by rotation about the trunnions 17,17. This rotation can be achieved by arrangements of different kinds but may be performed by the device shown on the drawing.

On either end wall 12,13 there is attached a cable seating segment 24 (FIG. 2) with a cable groove extending arcuately about the trunnion 17. In the initial position shown in FIG. 2, a pulling cable 25 has one end attached to the highest point 26 of the segment. The segment 24 is suitably circular and concentric with the trunnion. The cable lies snug against the segment for about a quarter of a revolution and thereafter extends to one end of a cable tensioning means 27, the other end of which is coupled to a fitting 28 of the carrying beam 15 at a point on the other side of the central plane of the vehicle in relation to the pin 18 for the respective pivoting arm 16.

The cable tensioning means comprises a hydraulic cylinder 29 (FIG. 4) having a displaceable piston 30 to which is attached a piston rod 31 extending outwards from the lower end of a cylinder and being attached to the fitting 28. Inside the cylinder, between the piston and lower end wall of the cylinder, there is a helical compression spring 32 which is biassed to hold the cable 25 tensioned, with the container in the position shown in FIG. 2, with a predetermined force, for example approx. 1 ton for both cylinders, which is sufficient to hold the container pressed firmly against the carrying beams 15. The prestressed cables 25 fix the container 9 in the transporting position in combination with the pivoting arms 16,16.

When the container is to be lifted and rotated to be emptied, oil under pressure is supplied to the cylinder 29 of the tensioning means, on the opposite side of the piston 30 to the spring 32, and effects a displacement of the piston and compression of the spring to a predetermined position, determined by a stop (not shown).

This compression of spring 32 results in a predetermined slackening of the cable 25, for example in the order of magnitude of 6 cm. When the container is now lifted by the jacks 22 and swung outwards on pivoting arms 16,16, the cables 25 will gradually straighten out and are completely tensioned when the arms 16,16 are in a certain position. Continued swinging of the arms 16,16 by means of the jacks 22 results in that the cables 25 rotate the container through segments 24,24 at either end of the container, so that the container is tipped more and more during the continued upward swing of the arms 16,16.

FIG. 3 shows how the container has been lifted, transversely displaced and tipped to an intermediate position, tipping having been provided by the tensioned cable 25 turning the segment 24 and thereby the container. On continued lifting and tipping, the container reaches the emptying position according to FIG. 4. In this position the contents of the container slide down along the container side wall 10. The contents slide over a glide plate 34, fastened between the pivoting arms 16,16, to guide the contents over the carrying wheels 23 and down onto the ground at the side of the vehicle.

FIG. 5 shows the container in a storage position in which it is locked by means of a retractable strut 35. In this position rain or snow cannot fall into the container.

FIG. 6 shows the container raised and tipped to the right into the emptying position. For this purpose the pivoting arms 16,16 have been taken out of action by removing the pins 18, and the corresponding pins 18a have instead been inserted in the holes in the lower ends of the other pair of pivoting arms 19,19 and corresponding holes in the ends of the beams 15, to provide pivotable mounting of the arms 19,19. The glide plate is denoted by 34a. The cable 25 has been taken over the segment 24 from the opposite direction, and the attachment of the cable tensioning means 27 has been moved over to the other side of the chassis, i.e. to the fitting 28a. Operation of the container is otherwise the same as is described above in conjunction with FIG. 1.

In a simplified embodiment of the invention, the hydraulic cylinder 22 at either end of the container can be made double-acting, so that in one force direction it functions for lifting the container in the way described above, while in the reverse direction of force in the transporting position of the container according to FIG. 2 it serves to lock the container to the carrying beams 15. In this embodiment the cable tensioning means 27 can be dispensed with, the cable 25 being extended directly to the fastening 28. In the transport position according to FIG. 2, the cable 25 has a predetermined amount of slack, which is taken up when the container is lifted so that the cable begins to tip the container when the container has been lifted to a certain height.

This embodiment is shown in FIGS. 7 and 8 which are a rear end view of the vehicle with the container in its transporting position in FIG. 7 and in its maximum emptying position in FIG. 8.

In FIGS. 7 and 8 the container 35 is of substantially the same construction as container 9 in FIGS. 1 and 2 with side walls, end walls and a bottom formed by plates which are welded on the inside of a basket of struts as will be understood from the drawings. However, since the container 35 is intended to be tipped only to the right side of the vehicle, the right side wall 11a is somewhat more reinforced than the left side wall 10a.

For the sake of simplicity, only the rear end of container 35 is shown, since the front end is identical.

The container 35 rests in its transporting position on carrying beams 15a secured to the chassis of the vehicle.

At either end of the container 35 there is a transverse carrying beam 36 which is shorter than the beam 15 in FIG. 2, since only its one end is to be used as a support for the journalling pin 18b, to which the lower end of the pivot arm 19a is hingedly connected and located near the right hand side of the vehicle and at somewhat higher level above the wheels 23 than the corresponding pins 18a in FIG. 6.

Substantially at the vertical centre line of the container and in the area of the middle of its height, there is a segment 24a secured to each end wall of the container, and coaxially with this segment there is a trunnion 17a for journalling the upper end of the pivot arm 19a.

The upper end of the pivot arm 19a has an attachment 37, to which is hingedly connected the upper end of a hydraulic jack 22a of the double-acting type and including a piston 38 movable in the cylinder 39 and connected to a piston rod 40 connected to the attachment 37, whereas the lower end of the cylinder is pivotably connected to an attachment 41 on the beam 36 near the middle of the vehicle. Oil may be admitted and discharged through conduits 42 and 43.

In the transporting position the conduit 42 is blocked off so that the jack 22a at each end of the container locks the container in this position. Although, the considerable weight of the container will tend to maintain the container in this position.

To the circumference of the segment is secured an arcuate cable guide member 24b having an open groove for receiving the cable 25a. In FIG. 7 the upper end portion of the cable 25 is positioned in the guide member 24 along its whole length and is secured with its end at 44 to the guide member and segment 24a, respectively.

The lower end of the cable is secured to an adjustable attachment 45 which is hingedly connected to a pin 46 carried by lugs secured to the beam 36. The length of the cable between the attachment 44 and the pin 46 is adjusted so that the cable 25a will hang loose or slackened in the transporting position, as indicated in FIG. 7. In practice, the cable may be slackened for example about 6 cm.

When the container is lifted by means of the jacks 22a, the cable 25a will become stretched when the container is at a predetermined height, and upon continued lifting, the cable will actuate the segment 24a and rotate the container on the trunnions 17a, as described in connection with the embodiment in FIGS. 1 and 2.

Since in most cases the container needs only to be tipped to one and the same side of the vehicle, the embodiment in FIGS. 7 and 8 will be preferred, due to its greater simplicity.

The device according to the invention may of course be used in connection with containers on trucks or trailers for transporting any goods or contents which are to be unloaded by tipping the container. Accordingly, the container may also be used to advantage for any granular material.

What I claim is:

1. A freight vehicle having a chassis carrying a container, means to tip the container transversely to empty it, the bottom, side and end walls of the container (35; FIG. 7) being connected to each other, each end wall having an upper journalling means (17a) pivotably mounting one end of a pivoting arm (19; FIG. 7), the other end of said arm being pivotally (18b) connected to mounting means rigidly connected to the chassis, said tipping means comprising means for swinging both arms (19a,19a) about two longitudinal coaxial pivots (18b) situated at one side of the vehicle, said journalling means (17a,17a) on the end walls being coaxial and situated at such a height above the bottom of the container that after swinging both the pivoting arms (19a,19a) upward for simultaneously lifting the container, the container tips in the upper journalling means (17a,17a) into a position in which one side wall (11a) of the container is inclined downwardly toward that side of the vehicle where the pivoting arms are mounted (18b), the journalling means on either end wall being situated substantially on the vertical center line of the end wall, and the length of said arms and the height of said journalling means and said swinging means being such that when said one side wall is inclined downwardly, said arms have not passed over center above their pivotal connection to said mounting means.

2. A freight vehicle as claimed in claim 1, characterized in that the journalling means at either end of the container is connected to the upper end of a supporting trestle (FIG. 2) having two supporting legs (16,19; 16,19), one on either side of the chassis, both supporting legs being connectable to said mounting means (18,18a) on the chassis for forming a pivoting arm between the journalling means on the container end wall and one or other of the mounting means on the chassis.

3. A freight vehicle as claimed in claim 1 having wheels, characterized in that, on that side of the chassis where emptying is to take place, there is provided a glide plate attached between the pivoting arms to guide the contents of the container over the side of the chassis and laterally beyond the wheels of the vehicle when the container is emptied.

4. A freight vehicle as claimed in claim 1, said tipping means comprising at least one hydraulic jack which with said arms provide transverse displacement of the container.

5. A freight vehicle having a chassis carrying a container, means to tip the container transversely to empty it, the bottom, side and end walls of the container (35; FIG. 7) being connected to each other, each end wall having an upper journalling means (17a) pivotably mounting one end of a pivoting arm (19; FIG. 7), the other end of said arm being pivotally (18b) connected to mounting means rigidly connected to the chassis, said tipping means comprising means for swinging both arms (19a,19a) about two longitudinal coaxial pivots (18b) situated at one side of the vehicle, said journalling means (17a,17a) on the end walls being coaxial and situated at such a height above the bottom of the container that after swinging both the pivoting arms (19a,19a) upward for simultaneously lifting the container, the container tips in the upper journalling means (17a,17a) into a position in which one side wall (11a) of the container is inclined downwardly toward that side of the vehicle where the pivoting arms are mounted (18b), the journalling means on either end wall being situated substantially on the vertical center line of the end wall, at least one said end wall having a cable segment having a cable groove which extends arcuately about the journalling means on the end wall, a cable attached to the cable segment at one end and extending along a portion of the cable segment and connected to the chassis, there being a predetermined amount of slack in the cable when the container is in an upright position, said slack being so adjusted that it is taken up when the container has been lifted a predetermined amount, whereafter continued lifting of the container with the cable tensioned causes the cable to be wound from the cable segment to rotate the container toward its emptying position, which is attained when the pivoting arms have swung to an outer predetermined end position.

6. A freight vehicle having a chassis carrying a container, means to tip the container transversely to empty it, the bottom, side and end walls of the container (35; FIG. 7) being connected to each other, each end wall having an upper journalling means (17a) pivotably mounting one end of a pivoting arm (19; FIG. 7), the other end of said arm being pivotally (18b) connected to mounting means rigidly connected to the chassis, said tipping means comprising means for swinging both arms (19a,19a) about two longitudinal coaxial pivots (18b) situated at one side of the vehicle, said journalling means (17a,17a) on the end walls being coaxial and situated at such a height above the bottom of the container that after swinging both the pivoting arms (19a,19a) upward for simultaneously lifting the container, the container tips in the upper journalling means (17a,17a) into a position in which one side wall (11a) of the container is inclined downwardly toward that side of the vehicle where the pivoting arms are mounted (18b), the journalling means on either end wall being situated substantially on the vertical center line of the end wall, said upper journalling means (17a) hingedly connecting the two pivot arms (19a) to the ends of the container (35) being located substantially at the vertical centre plane of the container and at the area about half the height of the container, concentric with the upper journalling means there being secured an arcuate cable segment (24a) for the upper end portion of a cable (25a) guided in the circumference of the segment and having its end secured (44) to the segment, the lower end of the cable being secured (46) to the chassis of the vehicle, the length of the cable being so adjusted that the cable is slackened (FIG. 7) a predetermined amount when the container is in its transporting position, each pivot arm (19a) being actuated by a power cylinder for swinging the pivot arm, lifting the container to a predetermined height resulting in absorbing the slack of the cable and so that continued lifting of the container will cause rotation of the container due to the cable acting on the segment until the container is in its emptying position (FIG. 8) with its lower side wall (11a) having its edge adjacent the side of the vehicle substantially at the same level as the lower ends of the pivot arms.

* * * * *